United States Patent [19]

Snyder, Sr.

[11] Patent Number: 5,713,972
[45] Date of Patent: Feb. 3, 1998

[54] PARTICULATE MATTER FILTRATION SYSTEM

[76] Inventor: Ronald Robert Snyder, Sr., 4934 Washington St., Schnecksville, Pa. 18078-2007

[21] Appl. No.: 606,687

[22] Filed: Feb. 26, 1996

Related U.S. Application Data

[63] Continuation-in-part of Ser. No. 276,264, Jul. 18, 1994, abandoned.

[51] Int. Cl.⁶ ........................................ B01D 46/26
[52] U.S. Cl. ............... 55/317; 55/333; 55/385.3; 55/404; 55/409; 55/523; 55/DIG. 30
[58] Field of Search ................... 55/261, 266, 317, 55/318, 320, 332, 385.3, 400, 404–409, 523, DIG. 30, 328; 95/277, 278

[56] References Cited

U.S. PATENT DOCUMENTS

| | | | |
|---|---|---|---|
| 2,228,129 | 1/1941 | Stephano | 55/408 |
| 2,792,909 | 5/1957 | Court | 55/405 |
| 3,008,543 | 11/1961 | Bourdalé et al. | 55/317 X |
| 3,013,629 | 12/1961 | Lowther | 55/320 X |
| 3,104,962 | 9/1963 | Duer | 55/404 X |
| 3,107,987 | 10/1963 | Duer | 55/404 X |
| 3,116,990 | 1/1964 | Duer | 55/404 X |
| 3,289,397 | 12/1966 | Schonewald et al. | 55/400 X |
| 3,292,347 | 12/1966 | Hodgkinson | 55/400 X |
| 3,440,800 | 4/1969 | Messen-Jaschin | 55/404 X |
| 3,447,290 | 6/1969 | Flory | 55/404 X |
| 3,708,957 | 1/1973 | Labadie | 95/277 |
| 3,828,524 | 8/1974 | Booth et al. | 95/277 X |
| 3,877,906 | 4/1975 | Peterson | 55/404 |
| 3,931,016 | 1/1976 | Lovelady | 55/400 X |
| 4,108,778 | 8/1978 | Lambert et al. | 55/317 X |
| 4,193,779 | 3/1980 | Hencke | 55/408 X |
| 4,222,755 | 9/1980 | Grotto | 55/385.3 X |
| 4,276,071 | 6/1981 | Outland | 55/523 |
| 4,832,709 | 5/1989 | Nagyszalanczy | 55/404 X |
| 4,925,463 | 5/1990 | Kuhnert | 55/523 X |
| 4,948,397 | 8/1990 | Kumar | 95/277 |
| 4,981,502 | 1/1991 | Gottschalk | 55/400 |
| 4,994,097 | 2/1991 | Brouwers | 55/408 X |
| 5,013,340 | 5/1991 | Taslim et al. | 55/290 |
| 5,201,422 | 4/1993 | Ihara et al. | 55/406 X |

FOREIGN PATENT DOCUMENTS

| | | | |
|---|---|---|---|
| 56-017133 | 4/1981 | Japan | 95/277 |
| 1457968 | 2/1989 | U.S.S.R. | 55/317 |
| 0762433 | 11/1956 | United Kingdom | 55/317 |

*Primary Examiner*—Robert Spitzer

[57] ABSTRACT

A Particulate Matter Filtration System, finding application for the filtration of particulate matter which is present in the combustion exhaust gases of internal combustion engines in general, manufacturing processes resulting in the generation of industrial factory exhaust, coal, wood or oil fired furnaces and the like and all particulate laden gas streams. The system comprises a rotating filter assembly comprised of a plurality of materials suitable for the filtration of such particulate matter from all particulate laden gas streams and is of sufficient volumetric construction in order to provide the proper filtering and flow with respect to the volume of gases generated by a particular application, an outer shell enclosure providing a radial boundary to confine the particles, a collector for the particles to come to rest in, and having a drive to provide the necessary rotational speed to provide aerodynamic and centrifugal forces. The exhaust gases are temporarily confined in the outer shell enclosure by a seal near the exit end of the unit and are forced to pass through the rotating filter assembly to exit the particulate matter filtration system. As particulates accumulate on the outer surface of the rotating filter assembly, they are caused to be spun off by aerodynamic and centrifugal forces acting to lift them from the filter element surface. The particulates combine with other particulates achieving a sufficient density, whereby settling occurs due to terrestrial gravitational forces into the collector for subsequent removal.

13 Claims, 2 Drawing Sheets

PARTICULATE MATTER FILTRATION SYSTEM

CROSS REFERENCE TO RELATED APPLICATION

The present application is a continuation in part of application Ser. No. 276,264, filed Jul. 18, 1994, entitled Particulate Matter Filtering System, and now abandoned.

FIELD OF THE INVENTION

This invention relates to a rotating filtration device which is capable of separating small solid particulates which have a cross sectional dimension in the range of 1 to 10 microns in size from streams of gases, the likes of which may be found in those gas streams generated by the combustion processes of internal combustion engines, the manufacturing processes used in factory and industrial plants, wood, coal or oil fired power plants and the like, and for all particulate laden gas streams, and of which the majority of these off gas streams more often than not contain very fine particulates in the form of respirable matter that is often in the range of 1 micron in size.

BACKGROUND OF THE INVENTION

It is a widely recognized fact that these exhaust gases produced by these processes results in the discharge of undesirable pollutants carried in those exhaust gases being released into the atmosphere in the form of respirable matter.

Moreover it is also well known that volatile organic compounds such as Oxides of Nitrogen, Reactive Organic gases (Hydrocarbons), Carbon Monoxide and Carbon Dioxide that are a necessary byproduct of these processes more often than not condense and form a mechanical and/or chemical attachment to these very fine respirable matter, and which because of the very nature of their minute size can be inhaled and lodge deep within the lungs, causing respiratory distress and sometimes serious health complications. These harmful pollutants are identified in the form of 1) Reactive Organic Gases (ROG) or Hydrocarbons, 2) Oxides of Nitrogen (N0x), 3) Carbon Monoxide and Carbon Dioxide, (CO/$CO_2$), 4) Particulate Matter (PM) and Other Toxic Emissions, and of the five (5) that are identified here, four (4) are directly related to particulate matter or soot.

Having recognized this fact and In an effort to further control and reduce such harmful emissions, Congress passed the Pollution Prevention Act of 1990, stating "that pollution should be prevented or reduced at the source whenever feasible;" (Pollution Prevention Act of 1990, 42 USCA § 13101 (b)).

Additionally this law goes on to state that pollution that cannot be prevented should be recycled in an environmentally safe manner, whenever feasible; pollution that cannot be prevented or recycled should be treated in an environmentally safe manner whenever feasible; and disposal or other release into the environment should be employed only as a last resort and should be conducted in an environmentally safe manner.

Presently efforts that are considered source reduction techniques intended to reduce these harmful factory, industrial and power plant emissions, include smoke stack scrubbers, electrostatic traps, and filters.

Turning now to the combustion processes of internal combustion engines, current efforts for source reduction include the redesign of engines for more complete combustion, modification of combustion processes and re-formulation of fuels, including special additives, all designed to decrease the initial formulation of particulate matter but all essentially ineffective and cost prohibitive.

Additionally of the many devices employed for exhaust treatment and control, perhaps the most common is the provision to utilize various types of filtration elements that are transposed into the exhaust piping system for removal of these particulates. Normal driving conditions result in an accumulation of particulate matter on the exterior surface of the filter causing high and sometimes excessive back pressures which can and do result in increased fuel consumption, performance or power degradation and deterioration in overall driveability, resulting in a need for frequent, regeneration or replacement.

Presently the best known methods that are available for this regeneration include complex and expensive systems that are required to burn the particulates from the filter surface, more often than not resulting in and causing the filter element to deteriorate due to melting and cracking from the high heat required for such regeneration. Another method utilized in the regeneration and cleaning is by forcing fresh or compressed air through the filter using reverse flow techniques. These methods of regeneration and cleaning result in ineffective and cost prohibitive solutions to the problem, and the addition of unnecessary and expensive components to accomplish the task.

Moreover, if these modifications, treatments and controls were even remotely or economically feasible, and successful for their intended purpose, they alone would not significantly reduce emissions to acceptable levels that are now required by law.

Broadly then, it is an object of the present invention to provide a filtration system that obviates one or more of the aforesaid difficulties.

SUMMARY OF THE INVENTION

The present invention relates to a rotating filtration device (5,000 RPM) and more particularly to a rotating filtration device that is rotatably attached to a drive means, said filtration device being totally self cleaning and regenerative, capable of filtering particulate matter having a cross sectional area as small as 1 micron in size This self cleaning and regeneration is accomplished by the inherent action of centrifugal and aerodynamic forces induced in such a manner so as to provide this regeneration. Particulates that are filtered from the exhaust gases tend to accumulate on the exterior surface of the rotating filter assembly as it rotates within the Particulate Matter Filtration System. Those particulates are acted upon by aerodynamic and centrifugal forces generated by the rapidly and continuously spinning filter, which in turn causes the filtered particulates to be lifted from and to be propelled radially outward towards a radial boundary which extends parallel to and is substantially aligned with the axis of rotation.

The resultant radial velocity at which the particulates move outward can be calculated by using simple calculations employing centrifugal accelerations, a magnitude of the order of 2,000 times the earth's gravitational acceleration forces. It may be concluded using these formulae that particulates of 1 micron in size and having a specific mass of approximately 400 kilograms per cubic meter, will attain a centrifugal induced outward velocity of approximately 1 meter per second.

In order to assert such forces on a 1 micron particulate to achieve this velocity requires rotational speeds of approximately 5,000 revolutions per minute of the rotating filter assembly.

As the particulates are expelled outward they reach the radial boundary where they accumulate and combine with other particulates until they achieve a sufficient density, whereby settling due to terrestrial gravitational forces will occur. They can then be subsequently removed and safely disposed of.

An object of the present invention also provides a Particulate Matter Filtration System that operates in a manner that does not significantly increase back pressures, assuring no performance degradation or otherwise obvious restriction of the exhaust gas flow.

Another object of the present invention further provides a Particulate Matter Filtration System that offers significant operational improvement over current systems in removing particulates.

Another object of the present invention provides a Particulate Matter Filtration System being of minimum complexity, which is inexpensive to manufacture and install, and extremely convenient to use providing superior operation and low maintenance.

Another object of the present invention still further provides a Particulate Matter Filtration System which is completely self contained and driven by the force and velocity of the exhaust gases, requiring no extraneous components or drive mechanisms necessary to provide rotational means.

A further object of the present invention provides a Particulate Matter Filtration System which is adaptable to an extraneous drive means dependent on application from which derivative configurations of this filter type may find application in factory and industrial exhaust gas purification, air conditioning devices or for the removal of particulates from any particulate laden gas stream.

An exemplary preferred embodiment of the invention includes a housing having an inlet for coupling of the Particulate Matter Filtration System to an exhaust gas stream, the gases of which contain particulate matter, a suitable drive means to provide rotation, a collector and outer shell which provides a radial boundary and means for accumulation of the particulate matter having an inlet and outlet, and structure for mounting said filter assembly, and a filter tube having a through flow to allow mixing of hot filtered gases with ambient air and allow the cooled filtered gases to exit from said filter assembly. A dual layer filter component comprised of a plurality of materials, with a disposable secondary inner filter, comprised of high temperature spun glass fibers, and a porous removable and cleanable primary outer filter, constructed of such porous materials as ceramics, sintered bronze or sintered stainless steel, which when assembled and mounted in the Particulate Matter Filtration System transverses the exhaust gas flow in such a manner so as to cause the un-filtered gases to pass through both filters radially inwardly to achieve removal of the particulate matter of particulate laden gas stream sources.

The present invention is especially useful and will be discussed as to its application relative to diesel engines, however, it should be noted that this invention is applicable to all internal combustion engines, or to any application requiring the removal of particulate matter from a particulate laden gas stream of which specific applications may require alternative drive means.

DESCRIPTION OF THE DRAWINGS

This invention will be more fully understood from the following detailed description when taken in conjunction with the accompanying drawings in which.

REFERENCE NUMERALS

| | |
|---|---|
| 10 | Shell Enclosure |
| 11 | Inner Filter |
| 12 | Outer Filter |
| 14 | Bolt |
| 15 | Turbine |
| 16 | Turbine Housing |
| 17 | Filter Tube |
| 18 | Seal |
| 19 | Annular Bearing |
| 20 | Collector |
| 21 | Seal |
| 22 | Thermal Gasket |
| 23 | Inlet Tube |
| 24 | Opening |
| 25 | Spacer |

DETAILED DESCRIPTION OF THE INVENTION

Figure 1:
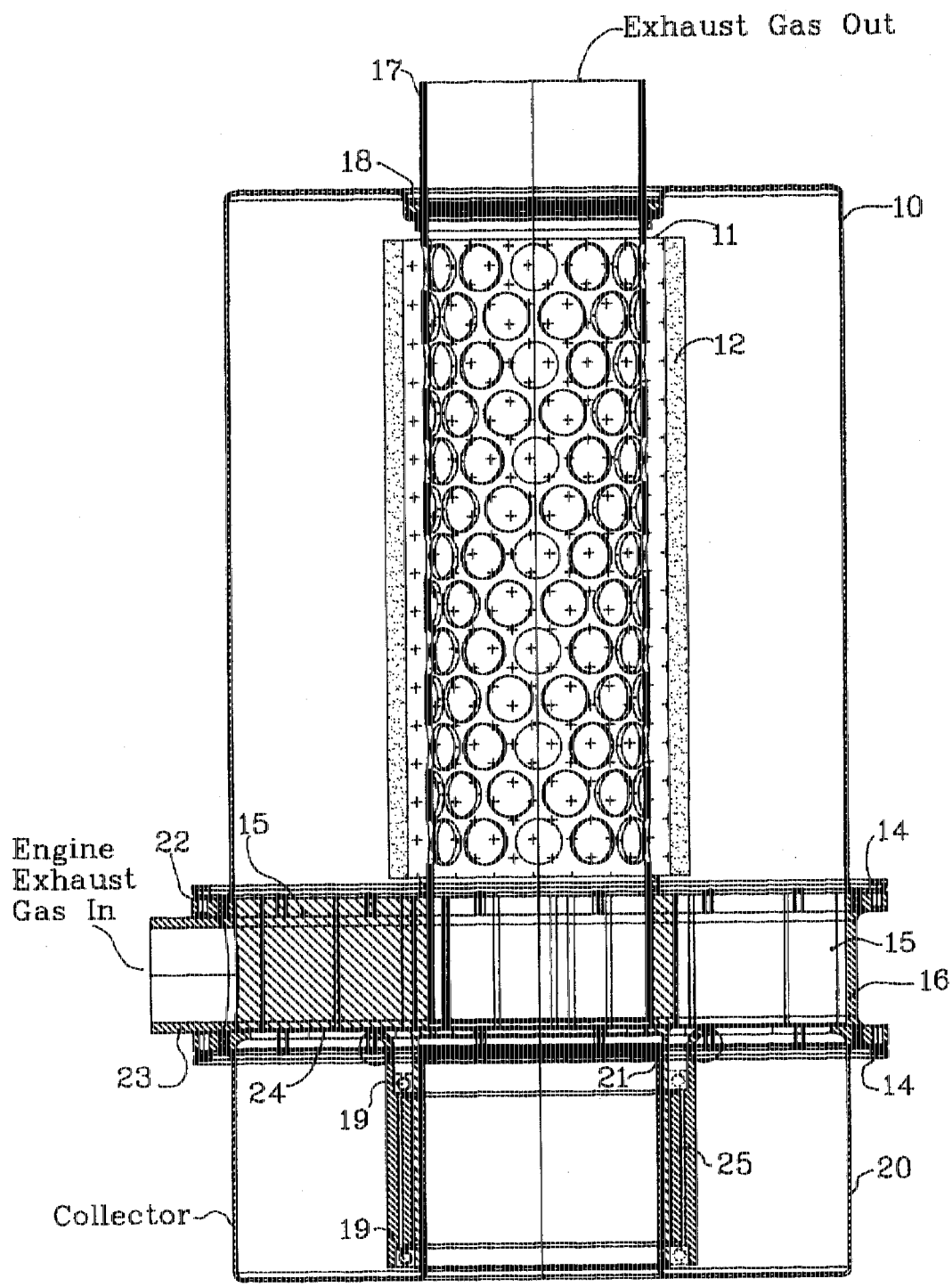
FIG. 1 is a diagrammatic cross section view of a filter system embodying the invention and FIG. 2 is a cross section view having the hatch removed for clarity to show the functionality of said filter.

The present invention is now described with particular reference to a Particulate Matter Filtration System intended specifically for use on a diesel engine. Turning now to FIG. 1, there is shown a filter system having an inlet tube 23 for attachment to the exhaust piping of a diesel engine and mounted in a vertical attitude. An ambient air duct in the collector 20, an exhaust outlet in the filter tube 17, a turbine 15, housed in a turbine housing 16 containing a pair of annular bearings 19 and a spacer 25. Attached to the lower side of the turbine housing 16 is a collector 20 securely fastened by a series of bolts 14. At the upper end of the shell enclosure 10 is a seal 18 to assure that all unfiltered gases are forced to pass through the outer filter 12 and inner filter 11, by providing a sealing interface between the shell enclosure 10 and the filter tube 17.

The turbine 15 provides an interface for the filter tube 17 and is open through to allow the mixing of ambient air entering through the collector 20 with the filtered exhaust gases, and providing the additional advantage of cooling of the turbine 15 and the pair of annular bearings 19. The filter assembly 11,12,17 is comprised of the filter tube 17, the inner filter 11 and the outer filter 12.

Figure 2:
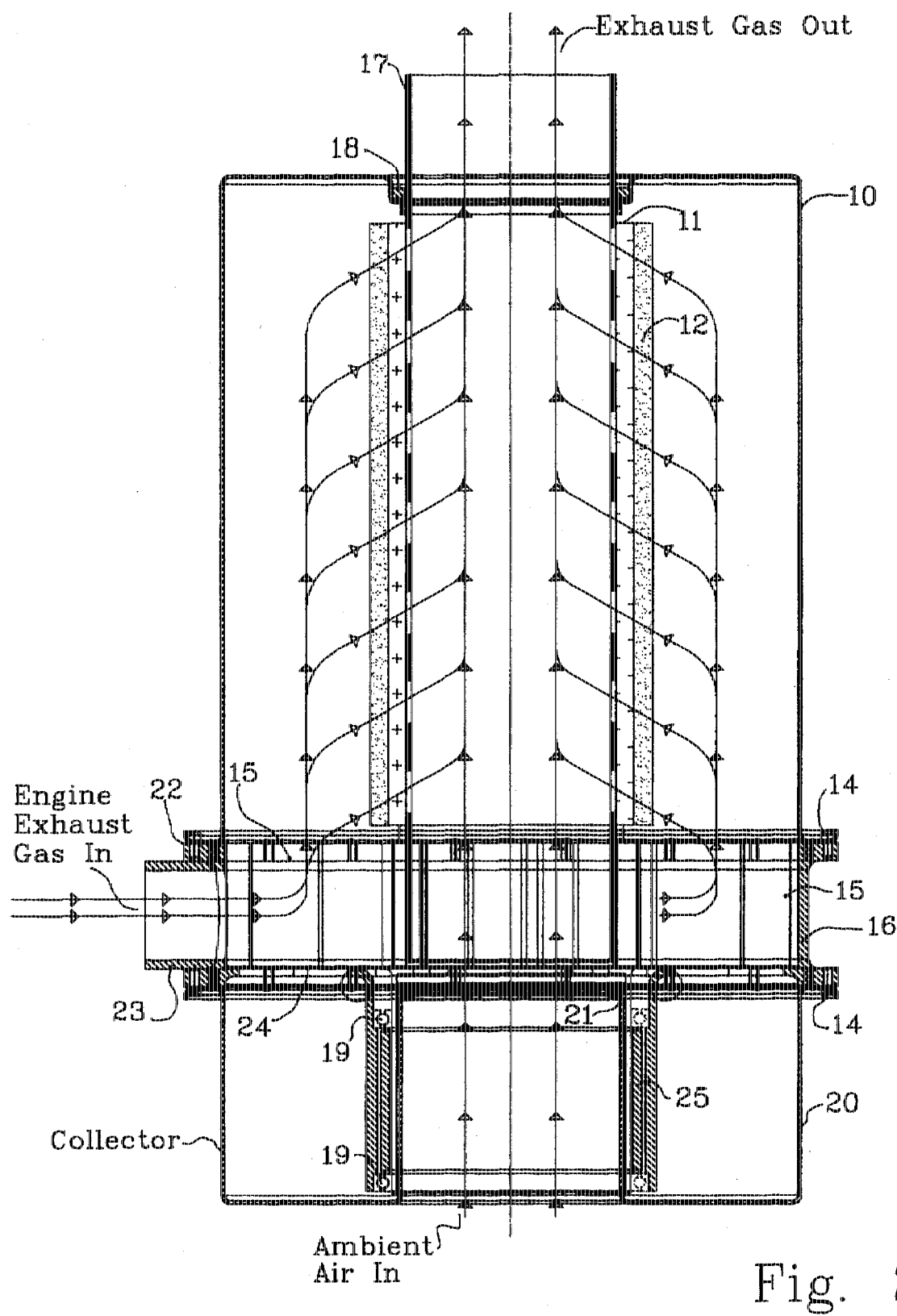

Turning now to FIG. 2, the principle of operation and function can be more easily understood by charting the gas flow through the Particulate Matter Filtration System.

As the combustion exhaust gas enters the inlet port 23 it first encounters the turbine 15 imparting a rotational force causing the turbine 15 and the filter assembly 11, 12, and 17 to rotate on its vertical axis. The turbine 15 and the filter assembly 11, 12, and 17 have a rotational speed that can be directly related to engine rpm, that is to say that the greater the engine speed, the greater the speed of the turbine 15 and filter assembly 11, 12, and 17 that will allow proper filtration action and regeneration of the filter.

As the gases pass through the turbine imparting rotational forces, they enter the main body cavity or shell enclosure 10, where they are confined on the outside of the rotating filter assembly by the continuing flow of combustion gas at the inlet tube 23 and the seal 18 interface between the shell enclosure 10, the filter tube 17, and the seal 21 providing an interface between the collector 20 and turbine 15 inner through bore.

This sealing feature effectively forces the exhaust gases to be directed through the filters 12 and 11 and the filter tube 17 where they are purified as the particulate matter is removed and allows for mixing the filtered gases with ambient air that is drawn in through the opening in the collector 20 by the exhaust gases as they exit upward from the filter tube 17.

The filtered particulate matter that is deposited and temporarily accumulates on the outside surface of the rotating filter assembly 11, 12, and 17 are then acted on by both aerodynamic forces causing the particulate matter to be lifted off the filter surface and by centrifugal forces generated by the rapidly rotating turbine 15 and filter assembly 11, 12, and 17 causing them to be thrown radially outward against the confines of the shell enclosure 10 where they will combine and attain a density sufficient to allow their egress through the opening 24 thereby settling in the collector 20 for removal and disposal at regular intervals.

This invention is applicable to the filtering of particulate material from particulate laden gas streams generated by the combustion processes of internal combustion engines in general, exhaust gases resulting from manufacturing processes used in factories and industrial plants, removal of particulates from the combustion gases of coal, oil and wood fired furnaces, and other apparatus producing such particulate laden gas streams that may require filtration. This particulate matter filtration system may have a variety of configurations and drive methods in its implementation to suit specific embodiments and operating environments. This invention is not to be limited to what has been particularly described.

What is claimed is:

1. A particulate matter filtration system for filtering particulate matter having cross-sectional dimensions from about 0.1 micron to about 10 microns from a gas stream, said filtration system comprising:

a housing having a central axis, a gas inlet, and being substantially adapted for mounting a shell enclosure, collector, bearings and drive means;

said housing providing a means for filtered particulate matter to pass through said housing into said collector, wherein said collector being substantially aligned with the axis of said housing and having a peripheral wall, end closure and opening defining a chamber, said end closure adapted for mounting a seal, said seal providing an interface between said end closure and said drive means, and said collector providing volume for the collection of expelled particulate matter;

wherein said drive means is significantly adapted for mounting a rotating filter tube rotably attached to said drive means along a rotation axis extending through said housing;

wherein said drive means is an auxiliary electric motor of sufficient rotational capacity to generate the aerodynamic and centrifugal forces necessary for expelling said filtered particulate matter;

wherein said shell enclosure opening being adapted for mounting to said housing and having an end closure adapted for mounting a seal, said seal providing an interface between said end closure and said rotating filter tube;

said rotating filter tube being substantially aligned with the rotational axis of said drive means and having perforations radially through the periphery of the tube allowing filtered gases to exit said particulate matter filtration system, thereupon mixing with ambient air, being drawn through the rotating filter tube by said exiting filtered gases, said rotating filter tube being adapted for mounting a rotating filter assembly;

wherein said rotating filter assembly for filtration of said particulate matter from particulate laden gas streams, is disposed transversely to said particulate laden gas streams flowing through said particulate matter filtration system;

wherein said rotating filter assembly means for filtration of said particulate matter from said particulate laden gas streams is comprised of a secondary inner filter element and a primary outer filter element.

2. Wherein the particulate matter filtration system of claim 1 is adapted with a gas inlet tube for attaching said particulate matter filtration system to devices producing particulate laden gas streams directly to said gas inlet.

3. Wherein the drive means of claim 1 for effecting rotational movement of said rotating filter assembly means utilizing the exhaust gas flow forces and velocities produced by said particulate laden gas streams.

4. The particulate matter filtration system of claim 1 wherein said drive means effecting rotational movement of said rotating filter assembly means is a turbine driven by the exhaust gas flow forces, substantially aligned and mounted in said housing.

5. Wherein the drive means of claim 1 wherein said drive means effecting rotational movement of said rotating filter assembly means is an electric motor, substantially aligned and externally mounted to said housing.

6. Wherein the drive means of claim 1 effecting the rotational means of said rotating filter assembly is of sufficient power to produce the speed necessary to generate the aerodynamic and centrifugal forces to cause said filtered particulate matter to be expelled therefrom said rotating filter assembly.

7. The particulate matter filtration system of claim 1 wherein ambient air is drawn through said rotating filter tube by the natural rise of hot said filtered gases providing cooling and increased life of said bearings, said seal and said rotating filter assembly.

8. The particulate matter filtration system of claim 1 wherein the secondary inner filter element is formed of high temperature spun glass fibers.

9. The particulate matter filtration system of claim 1 wherein the primary outer filter element is formed of a sintered bronze.

10. The particulate matter filtration system of claim 1 wherein the primary outer filter element is formed of a sintered stainless steel.

11. The particulate matter filtration system of claim 1 wherein the primary outer filter element is formed of a porous ceramic composite.

12. The particulate matter filtration system of claim 1 wherein the secondary inner filter element means is disposable.

13. The particulate matter filtration system of claim 1 wherein the primary outer filter element means is cleanable.

* * * * *